(12) United States Patent
Govzman

(10) Patent No.: US 6,386,609 B1
(45) Date of Patent: May 14, 2002

(54) GRIPPER DESIGN TO REDUCE BACKLASH

(75) Inventor: Boris I. Govzman, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 39 days.

(21) Appl. No.: 09/590,640

(22) Filed: Jun. 9, 2000

Related U.S. Application Data

(60) Provisional application No. 60/138,766, filed on Jun. 12, 1999.

(51) Int. Cl.⁷ .................................................. B66C 1/00
(52) U.S. Cl. ......................... 294/88; 294/119.1; 901/40
(58) Field of Search ................................ 294/88, 82.32, 294/115, 96, 93, 119.1, 902; 901/33, 40

(56) References Cited

U.S. PATENT DOCUMENTS

| | | | |
|---|---|---|---|
| 1,374,834 A | * | 4/1921 | Dooley |
| 4,717,189 A | * | 1/1988 | Gabriel |
| 4,872,803 A | * | 10/1989 | Asakawa |
| 4,943,099 A | * | 7/1990 | Gabriel |
| 4,968,081 A | * | 11/1990 | Reight et al. |
| 5,040,836 A | * | 8/1991 | Roudaut |
| 5,375,898 A | * | 12/1994 | Ohmori et al. |
| 5,669,652 A | * | 9/1997 | Reising et al. |
| 6,076,875 A | * | 6/2000 | Neff et al. |

* cited by examiner

Primary Examiner—Victor Batson
(74) Attorney, Agent, or Firm—Dugan & Dugan

(57) ABSTRACT

A gripper assembly is provided. The gripper assembly comprises a pair of moving assemblies. In an exemplary embodiment, the moving assemblies comprise a pair of grippers coupled to a pair of gripper fingers that have end effectors adapted to contact a wafer. A magnet is placed in each of the moving assemblies so that the attractive force between the magnets moves a portion of the moving assemblies toward each other.

10 Claims, 7 Drawing Sheets

GRIPPER DESIGN TO REDUCE BACKLASH

This application claims priority from U.S. provisional application Ser. No. 60/138,766 filed Jun. 12, 1999.

FIELD OF THE INVENTION

The invention relates generally to the field of robotics and more particularly to an apparatus for gripping an object between robotic fingers.

BACKGROUND OF THE INVENTION

Conventionally, wafer handler gripper assemblies comprise a pair of moving assemblies adapted to move between an open and closed position. The moving assemblies may comprise a pair of grippers coupled to extensions or gripper fingers that have end effectors for contacting a wafer (or a similar lightweight substrate). In practice, it is difficult to precisely position the grippers due to play (backlash) in the actuator gears. Precise positioning of the grippers is essential in order to place the end effectors in a repeatable position. End effector position must be tightly toleranced to avoid dropping wafers or damaging wafers by grasping them too tightly.

Accordingly, a need exists for an improved gripper assembly that will precisely position the grippers to place the end effectors in a repeatable position.

SUMMARY OF THE INVENTION

The present invention overcomes the problems of the prior art by placing a magnet on each of the moving assemblies so that the attractive force between the magnets moves a portion of the moving assemblies toward each other. Preferably, the magnet is placed on an inner side of each of the grippers. Thus, when the grippers are closed, magnetic attraction between the two magnets mounted on the grippers reduces or eliminates play (backlash) in the gripper assembly by consistently bringing the grippers to a desired position (e.g., as close together as possible).

Other features and advantages of the present invention will become more fully apparent from the following detailed description of the preferred embodiments, the appended claims and the accompanying drawings.

DETAILED DESCRIPTION OF THE PREFERRED EMBODIMENTS

An inventive gripper assembly is provided. The inventive gripper assembly may reduce or eliminate play therein by precisely positioning a pair of grippers. To fully understand the advantages of the inventive gripper assembly, a conventional gripper assembly is shown and described with reference to FIGS. 1A–B.

Figure 1A:
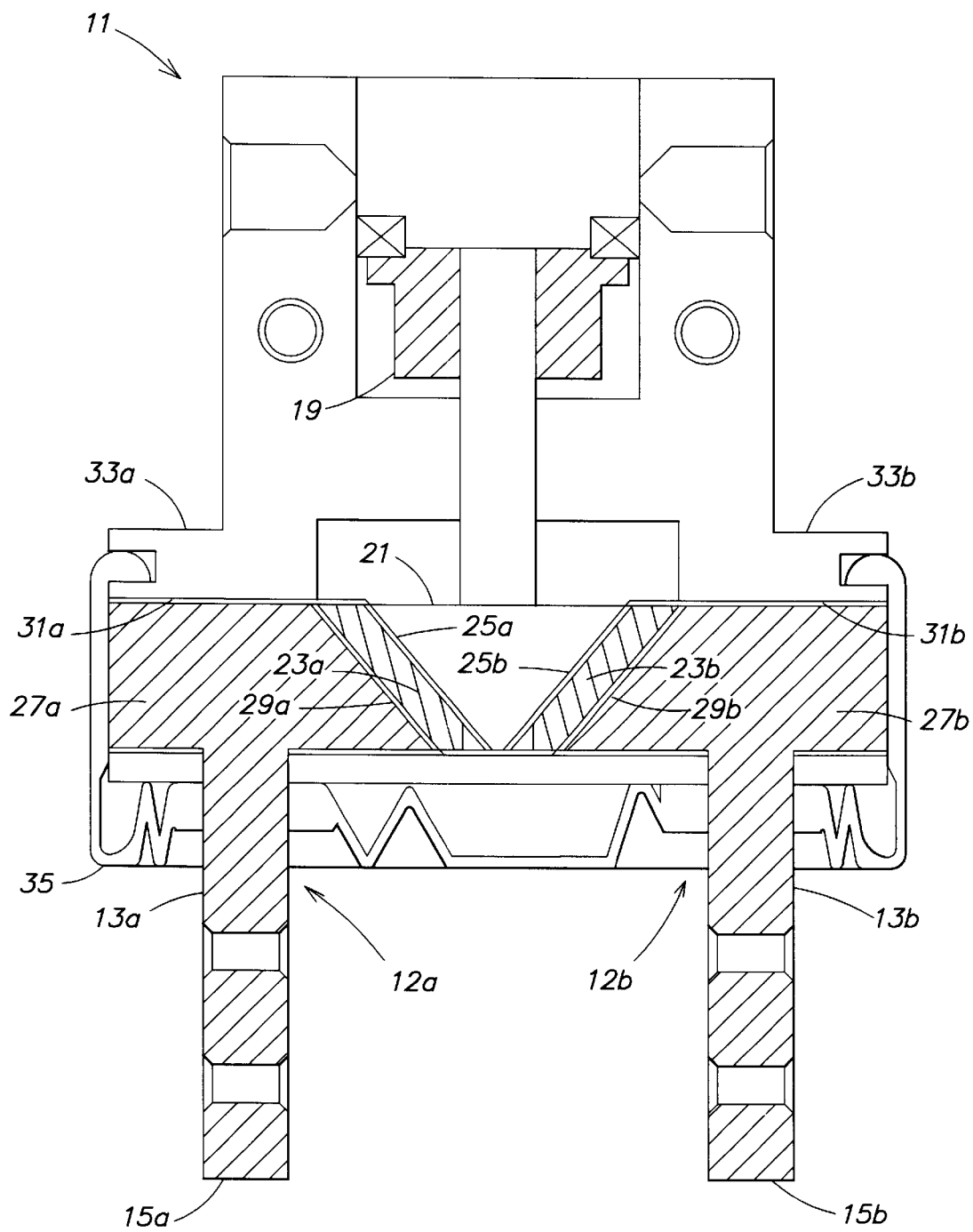
FIGS. 1A–B are schematic side cross-sectional views of a conventional gripper assembly, which show the gripper assembly in an open and closed position respectively.
Figure 1B:
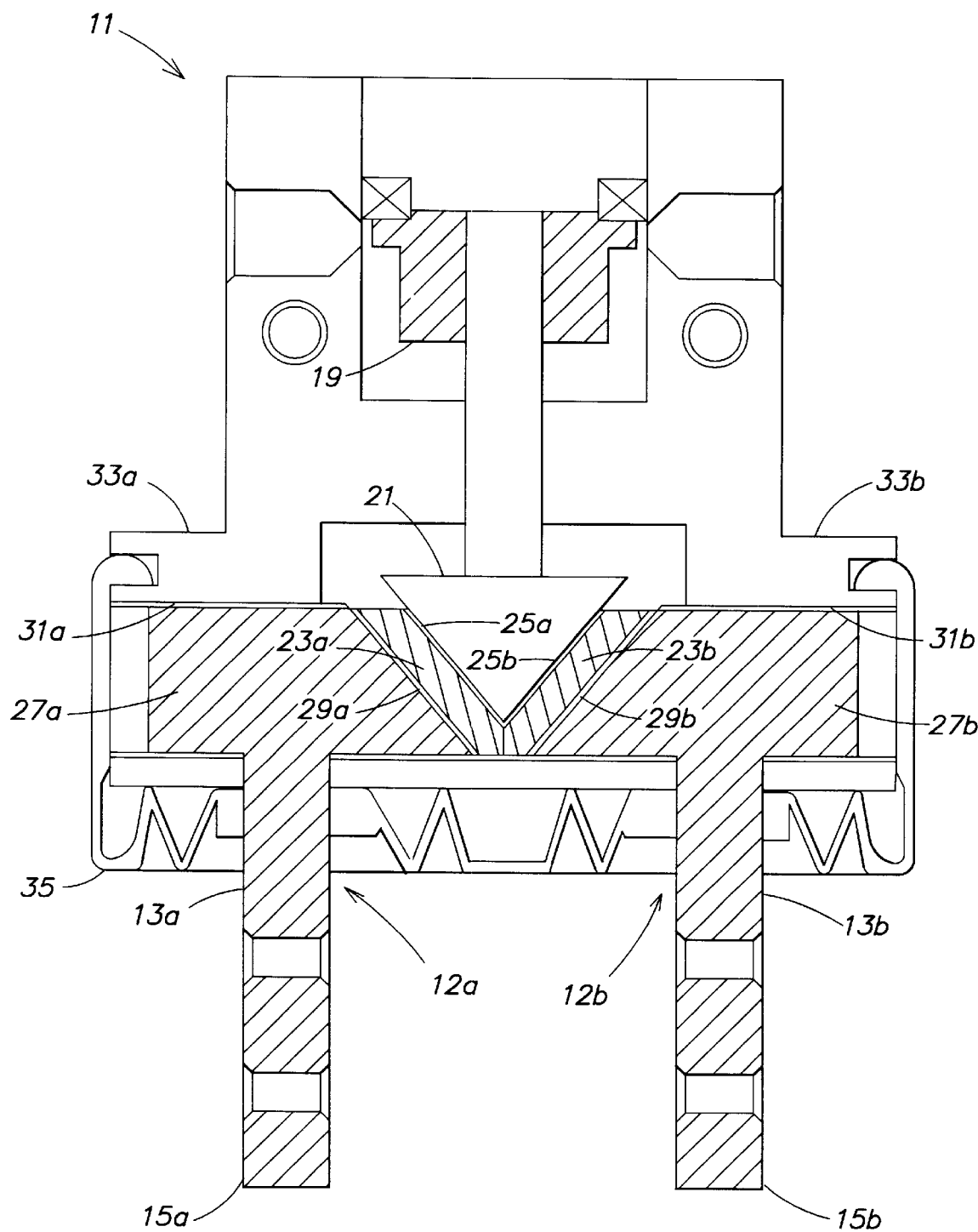

FIGS. 1A–B are schematic side cross-sectional views of a conventional gripper assembly 11, which show the gripper assembly 11 in an open and closed position respectively. The gripper assembly 11 comprises a pair of moving assemblies 12a, 12b. In an exemplary embodiment, the moving assemblies comprise a pair of grippers 13a, 13b coupled to a pair of gripper fingers 15a, 15b that have end effectors (not shown) adapted to contact a wafer (not shown).

The gripper assembly 11 also comprises a plurality of movable parts adapted to selectively position the grippers 13a, 13b in the open or in the closed position as described below. A plurality of sliding connections enables some of the moving parts to move relative to each other or relative to a non-moving part.

The moving parts comprise an actuator 19, having a piston (not shown), adapted to move vertically so as to vertically move a central wedge 21 connected thereto. The central wedge 21 is slidably coupled to a first side wedge 23a and a second side wedge 23b. First sliding connections 25a, 25b (e.g., tongue and groove couplings between abutting surfaces) between the central wedge 21 and the first and second side wedges 23a–b enable the side wedges 23a, 23b to slide toward each other as the central wedge 21 moves vertically up and enables the side wedges 23a, 23b to slide away from each other as the central wedge 21 moves vertically down. The first side wedge 23a and the second side wedge 23b are slidably coupled to a first block 27a and a second block 27b, respectively. Second sliding connections 29a, 29b between the side wedges 23a, 23b and the blocks 27a, 27b, respectively enable the blocks 27a, 27b to slide horizontally toward each other as the side wedges 23a, 23b slide toward each other and enable the blocks 27a, 27b to slide horizontally away from each other as the side wedges 23a, 23b slide away from each other.

Third sliding connections 31a, 31b between the block 27a, 27b and a non-moving part 33a, 33b enable the blocks 27a, 27b to slide relative to the non-moving part 33a, 33b as the blocks 27a, 27b move horizontally toward each other or horizontally away from each other. The first block 27a and the second block 27b are coupled to the pair of grippers 13a, 13b respectively. As the blocks 27a, 27b slide toward each other, the grippers 13a, 13b are positioned in the closed position as shown in FIG. 1B. As the blocks 27a, 27b slide away from each other, the grippers 13a, 13b are positioned in the oepn position as shown in FIG. 1A. A bellows 35 encloses the moving parts and is adapted to contain any particles generated by the moving parts. Manufacturers assemble the components of the gripper assembly 11 which specified dimensions. The specified dimensions have a range of acceptable dimensions (i.e., tolerances) such that the components may perform their intended function (e.g., the central wedge 21 should uniformaly slide against the side wedges 23a, 23b). The tolerances create a gap between the central wedge 21, the side wedges 23a, 23b, the blocks 27a, 27b, and the grippers 13a, 13b. The tolerances may result in large play (backslash) in the gripper assembly 11 as described below.

The operation of the gripper assembly 11 is described with reference to the sequential views of FIGS. 1A–B, which show the gripper assembly 11 in an open and closed position respectively. The gripper assembly 11 is initially in the open position as shown in FIG. 1A. In operation, the piston of the actuator 19 moves upward so as to move the central wedge 21 upward. In turn, the side wedges 23a, 23b simultaneously slide toward each other via the first sliding connections 25a, 25b such that the side wedges 23a, 23b are adjacent each other.

As the side wedges 23a, 23b slide toward each other via the second sliding connections 29a, 29b, the blocks 27a, 27b also simultaneously slide toward each other along the non-moving part 33 via the third sliding connections 31a, 31b. As the blocks 27a, 27b slide toward each other, the grippers 13a, 13b assume the closed position as shown in FIG. 1B. The grippers 13a, 13b, however, may not be precisely positioned in the closed position as described below.

As stated previously, the components of the gripper assembly 11 are manufactured with specified dimensions having a given tolerance (e.g., +/−0.001) for each surface. Hence, the sliding connections must have a tolerance which the sum of the tolerances for the two surfaces which comprise the sliding connection. After multiplying each tolerance (0.001) with the 6 sliding connections, the gripper assembly has a cumulative total tolerance of 0.006. The total tolerance (0.006) may result in large play (backlash) in the gripper assembly 11. When long gripper fingers (not shown) are employed, the tolerances result in a relatively large play on the end of the gripper fingers. Such play may cause the end effectors to drop expensive semiconductor wafers. Therefore, precise positioning of the grippers 13a, 13b is essential to place the end effectors in a repeatable position. Accordingly, the present inventor has developed an improved gripper assembly that may precisely position the grippers 13a, 13b as described below.

Figure 2A:
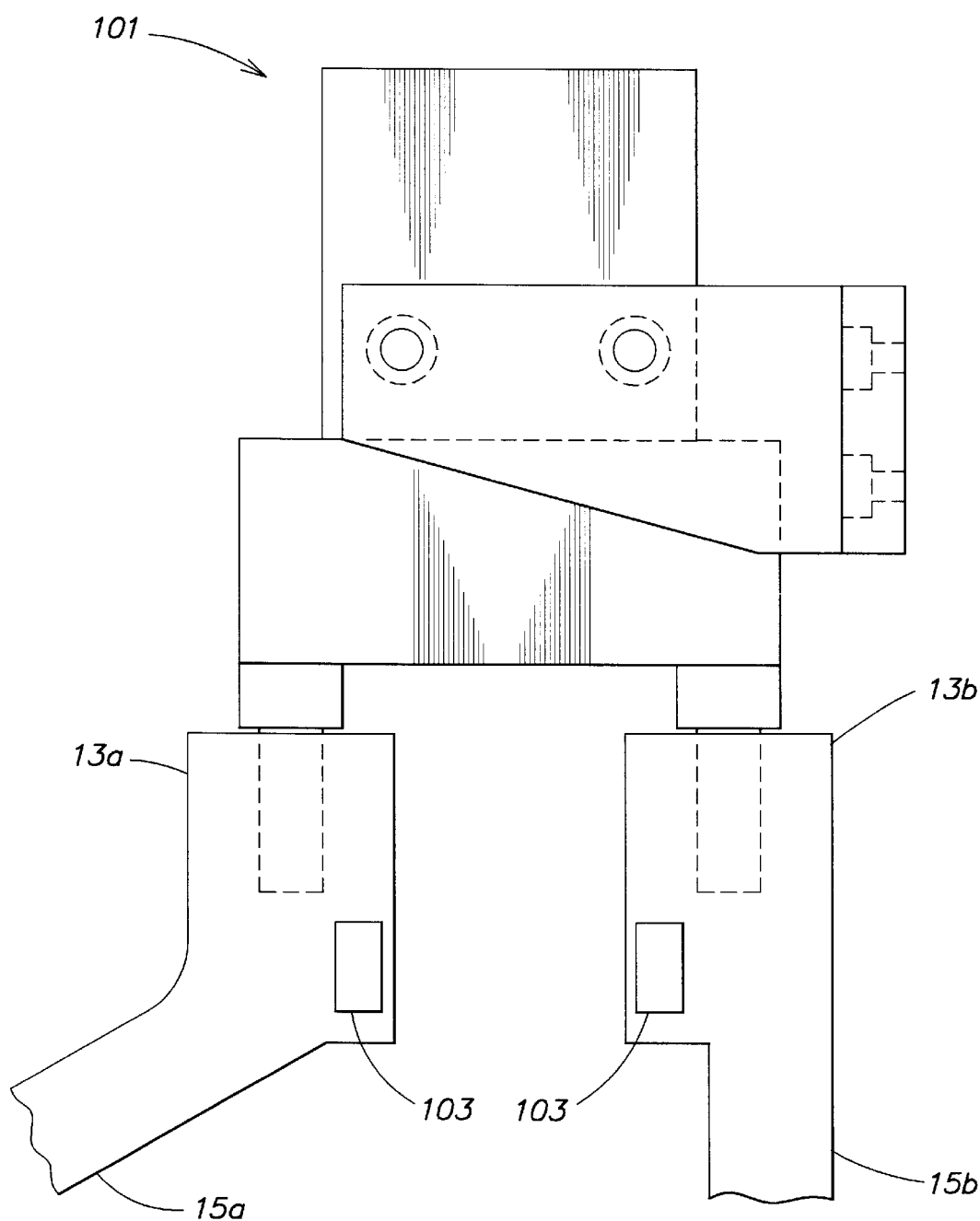
FIGS. 2A–B are schematic close-up side cross-sectional views of the inventive gripper assembly, which show the inventive gripper assembly in the open and closed position, respectively.
Figure 2B:
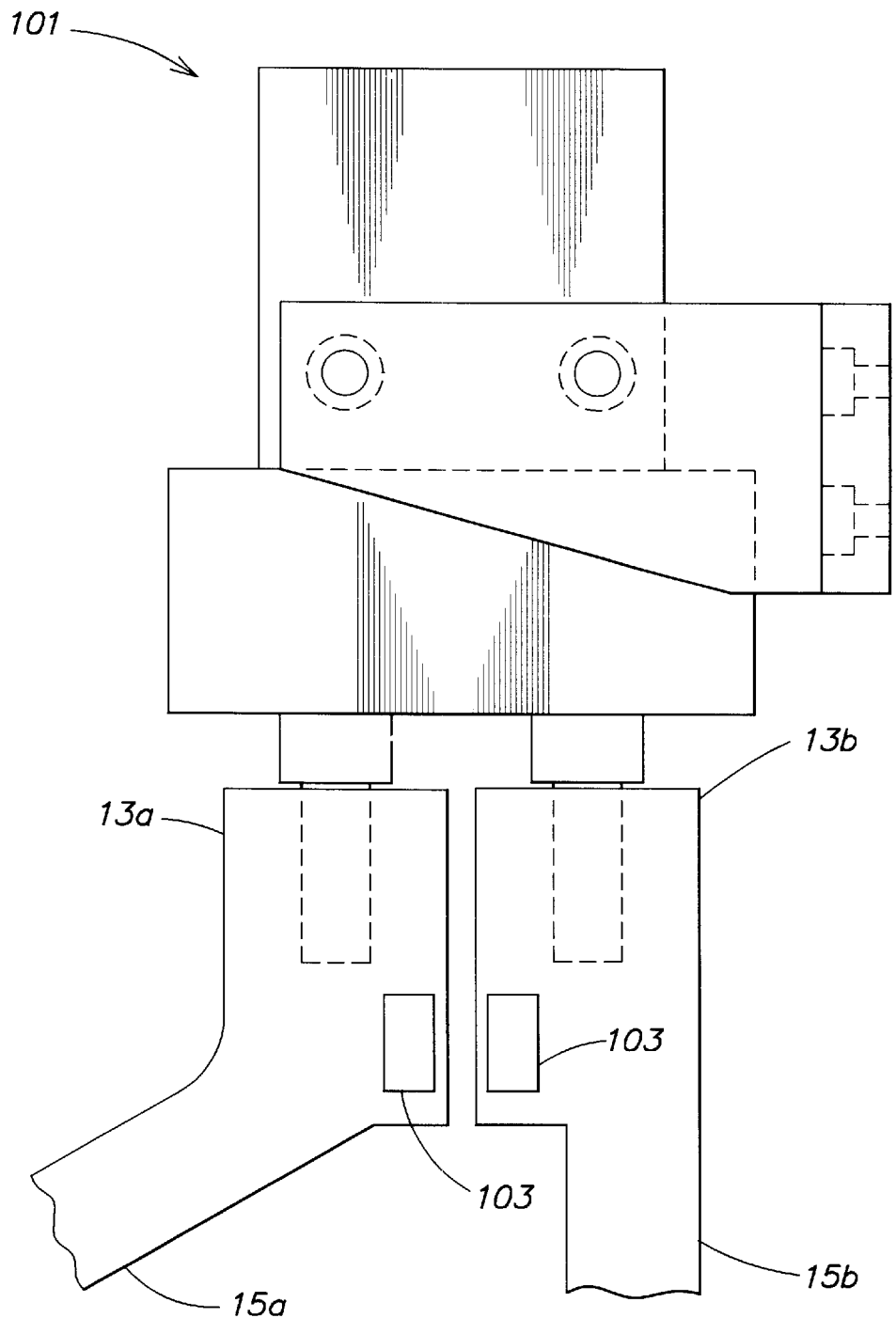

FIGS. 2A–B are schematic close-up side cross-sectional views of an inventive gripper assembly 101, which show the inventive gripper assembly 101 in the open and closed position respectively. The inventive gripper assembly 101 of FIGS. 2A–B may comprise the same components as the gripper assembly 11 of FIGS. 1A–B with the addition of a plurality of magnets 103 adapted to reduce or eliminate play in the inventive gripper assembly 101. The magnets 103 are preferably installed on the inner side of the grippers 13a, 13b respectively. The magnets 103, however, may also be installed in other components of the moving assemblies 12a, 12b rather than the grippers 13a, 13b. For example, the magnets 103 may also be installed on the gripper fingers 15a, 15b respectively rather than on the grippers 13a, 13b.

Figure 3A:
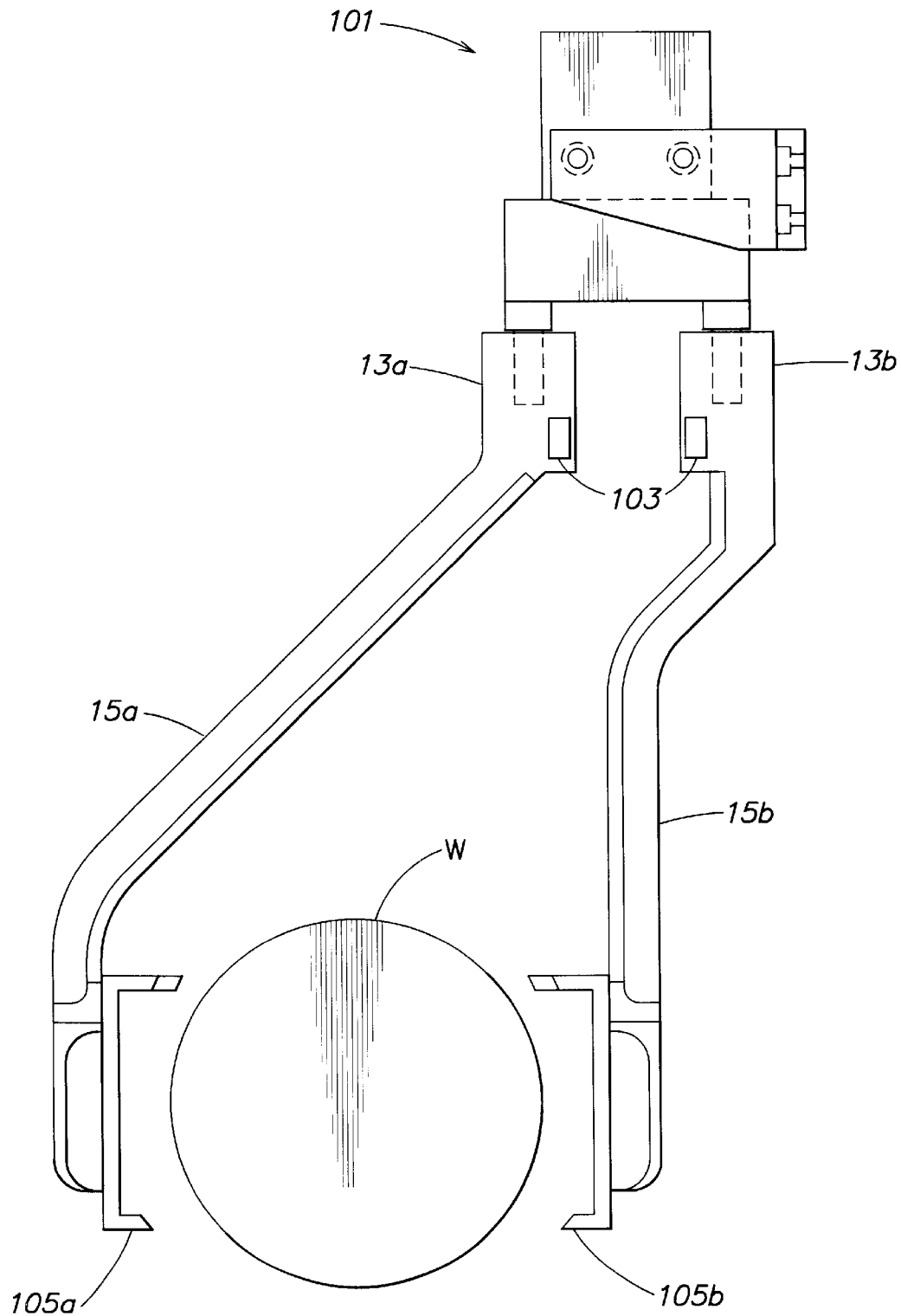
FIGS. 3A–B are schematic side cross-sectional views of the inventive gripper assembly with the end effectors adapted to contact a wafer, which show the inventive gripper assembly in the open and closed position, respectively.
Figure 3B:
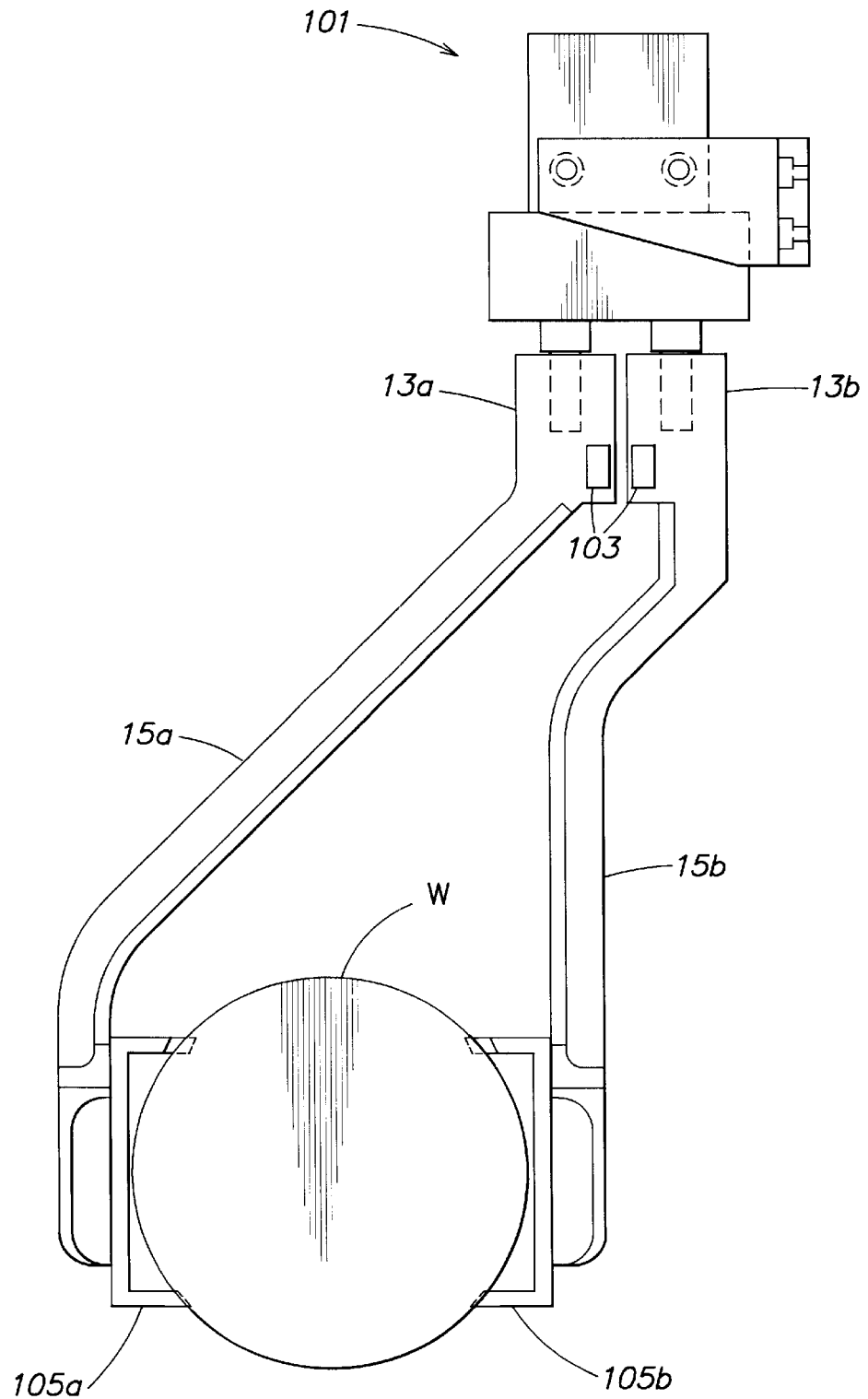

FIGS. 3A–B are schematic side cross-sectional views of the inventive gripper assembly 101 of FIGS. 2A–B showing end effectors 105a, 105b adapted to contact a wafer W, which show the inventive gripper assembly 101 in the open and closed position respectively.

The operation of the inventive gripper assembly 101 is described below with reference to FIGS. 2A–3B, which show the inventive gripper assembly 101 in the open position (FIG. 2A and FIG. 3A) and in the closed position (FIG. 2B and FIG. 3B) respectively. The inventive gripper assembly 101 is initially in the open position as shown in FIG. 2A and FIG. 3A. In operation, the piston of the actuator 19 moves upward so as to move the central wedge 21 upward. In turn, the side wedges 23a, 23b simultaneously slide toward each other via the first sliding connections 25a, 25b such that the side wedges 23a, 23b are adjacent each other.

As the side wedges 23a, 23b slide toward each other via the second sliding connections 29a, 29b, the blocks 27a, 27b also simultaneously slide toward each other along the non-moving part 33 via the third sliding connections 31a, 31b. After the blocks 27a, 27b slide toward each other, the grippers 13a, 13b, attached thereto and having the magnets 103 in place thereon, thus assume the closed position as shown in FIG. 2B and FIG. 3B. Hence, the gripper fingers 15a, 15b and the end effectors 105a, 105b also assume a closed position. In the closed position, the end effectors 105a, 105b contact the wafer W as shown in FIG. 3B.

The magnetic force (e.g., attraction) between the magnets 103 consistently moves the grippers 13a, 13b toward each other to a precise position thereby reducing or eliminating play in the inventive gripper assembly 101. Thus, the precise position of the grippers 13a, 13b places the end effectors 105a, 105b in a repeatable position. Accordingly, the end effectors 105a, 105b contact the wafer W in the desired position which may avoid dropping wafers or damaging wafers by otherwise mishandling them.

The invention can be advantageously employed with both pocket type and clamp type gripper assemblies (exemplary grippers are described in commonly assigned U.S. patent application Ser. No. 09/559,889, filed Apr. 26, 2000 which is incorporated herein in its entirety by this reference. In fact, the invention may be employed to reduce or eliminate backlash in any similar gearing mechanism, and is particularly useful in any parallel type gripper having gearing mechanisms that transform the gripper actuator's linear or rotational motion into linear gripper motion, whether such gripper assemblies are coupled in a straight manner, in a scissor-type configuration, or in a manner wherein moving the grippers 13a, 13b apart causes the end effectors 105a, 105b mounted on the end of the extended gripper fingers to move toward each other, etc.

Figure 4:
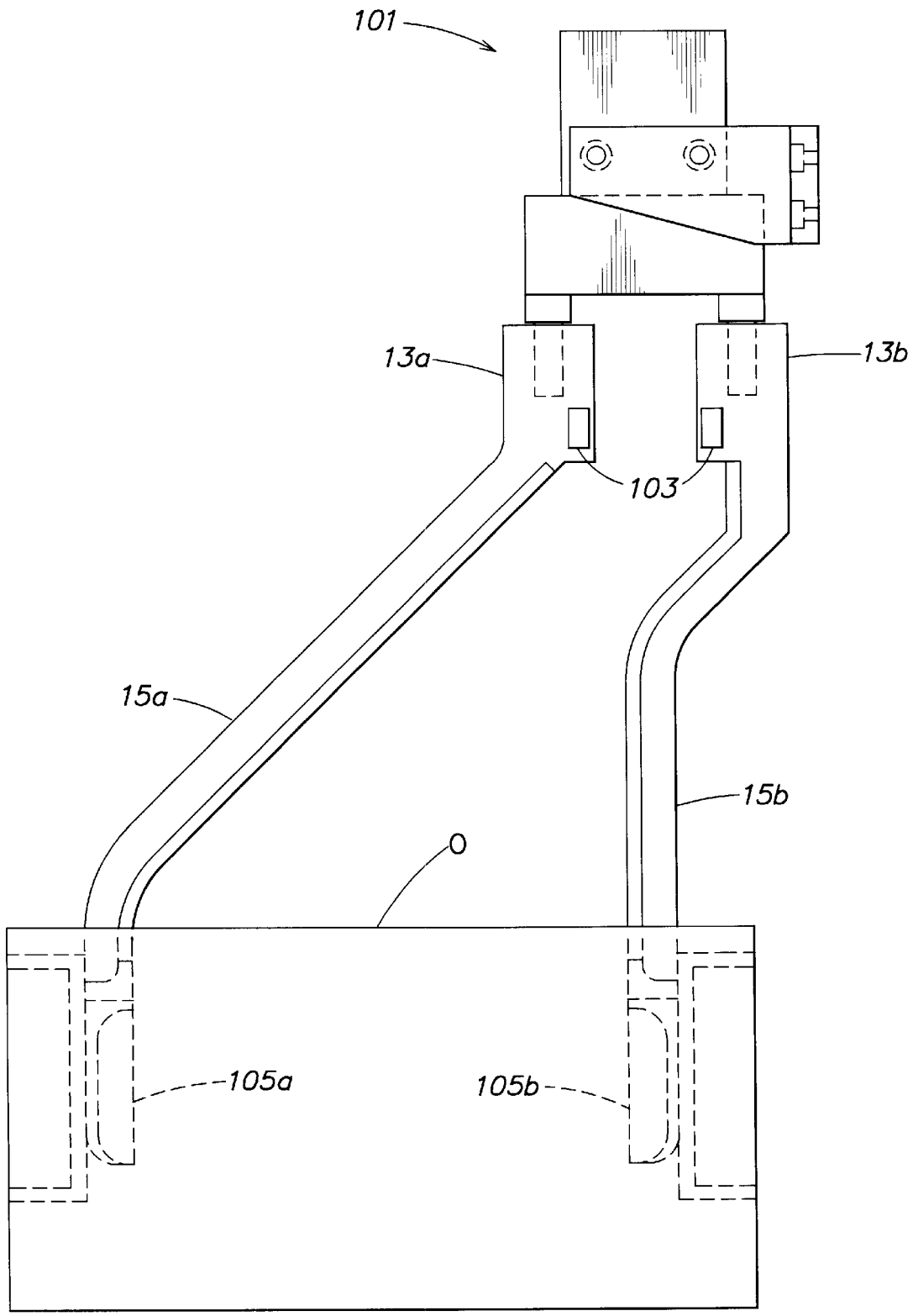
FIG. 4 is a schematic side cross-sectional view of an alternative embodiment of the inventive gripper assembly.

The foregoing description discloses only the preferred embodiments of the invention, modifications of the above-described apparatus and method which fall within the scope of the invention will be readily apparent to those of ordinary skill in the art. For instance, an alternative embodiment may couple the magnets 103 to other components of the moving assemblies 12a, 12b rather than to the grippers 13a, 13b as previously stated. Also, in an embodiment (see FIG. 4) wherein moving the grippers 13a, 13b apart causes the end effectors 105a, 105b mounted on the end of the gripper fingers 15a, 15b to move away from each other so as to contact an object (e.g., so as to grip a hollow object O) repulsive magnets may be coupled to the moving assemblies 12a, 12b.

Accordingly, while the present invention has been disclosed in connection with the preferred embodiments thereof, it should be understood that other embodiments may fall within the spirit and scope of the invention, as defined by the following claims.

What is claimed is:

1. A gripper assembly comprising:
   a pair of moving assemblies; and
   a pair of magnets, each coupled to one of the moving assemblies so that the force between the magnets moves a portion of the moving assemblies toward each other when the moving assemblies are closed.

2. The gripper assembly of claim 1 wherein the moving assemblies of claim 1 comprise:
   a pair of grippers;
   a pair of gripper fingers, each coupled to one of the grippers; and
   a pair of end effectors, each coupled to one of the gripper fingers.

3. The gripper assembly of claim 2 wherein the magnets are each coupled to one of the grippers so that the force between the magnets moves the grippers toward each other.

4. The gripper assembly of claim 2 wherein the magnets are each coupled to one of the gripper fingers so that the force between the magnets moves the gripper fingers toward each other.

5. The gripper assembly of claim 2 wherein the magnets are each coupled to one of the end effectors so that the force between the magnets moves the end effectors toward each other.

6. The gripper assembly of claim 1 wherein the magnets comprise attractive magnets.

7. A gripper assembly comprising:
   a pair of moving assemblies comprising
      a pair of grippers;
      a pair of gripper fingers, each coupled to one of the grippers; and
      a pair of end effectors, each coupled to one of the gripper fingers; and
   a pair of attractive magnets, each coupled to one of the moving assemblies so that the attractive force between the magnets moves a portion of the moving assemblies toward each other when the moving assemblies are closed.

8. A gripper assembly comprising:
   a pair of moving assemblies; and
   a pair of repulsive magnets, each coupled to one of the moving assemblies so that the force between the magnets moves a portion of the moving assemblies away from each other so as to hold a hollow object from inside the object.

9. A method comprising:
   positioning a pair of moving assemblies; and
   attracting the pair of moving assemblies toward each other when the moving assemblies are in a closed position;
   wherein attracting the pair of moving assemblies toward each other when the moving assemblies are in a closed position comprises placing a pair of attractive magnets in the moving assemblies, each attractive magnet coupled to one of the moving assemblies so that the attractive force between the magnets moves a portion of the moving assemblies toward each other when the moving assemblies are closed.

10. A gripper assembly comprising:
   an actuator;
   a pair of opposed grippers operatively coupled to the actuator;
   a pair of gripper fingers, each coupled to one of the grippers; and
   a pair of attractive magnets, each coupled to one of the gripper fingers so that the attractive force between the magnets moves the gripper fingers toward each other when the grippers are closed.

* * * * *